United States Patent [19]

Marx, III

[11] Patent Number: 4,500,481

[45] Date of Patent: Feb. 19, 1985

[54] METHODS FOR CONTROLLING VINYL PLASTIC EXTRUDATE

[75] Inventor: Morris F. Marx, III, Dunwoody, Ga.

[73] Assignee: AT&T Technologies, Inc., New York, N.Y.

[21] Appl. No.: 488,312

[22] Filed: Apr. 25, 1983

[51] Int. Cl.³ .............................................. B29F 3/08
[52] U.S. Cl. ................................ 264/40.6; 264/40.7; 264/68; 264/174; 264/DIG. 65; 425/144
[58] Field of Search ................ 264/40.5, 40.7, 40.6, 264/40.1, 211, DIG. 65, 68, 174; 425/144, 149, 145, 205, 207

[56] References Cited

U.S. PATENT DOCUMENTS

| | | | |
|---|---|---|---|
| 3,467,743 | 9/1969 | Otani | 425/205 |
| 3,698,844 | 10/1972 | Grimm | 264/40.6 |
| 3,704,972 | 12/1972 | Kneller et al. | 425/145 |
| 3,728,424 | 4/1973 | Bauer | 264/40.6 |
| 3,733,059 | 5/1973 | Petit | 264/40.6 |
| 3,824,479 | 7/1974 | Alger | 425/144 |
| 3,920,229 | 11/1975 | Piggott | 425/145 |
| 3,924,840 | 12/1975 | Nelson, Jr. | 324/140 D |
| 4,197,070 | 4/1980 | Koschmann | 425/135 |
| 4,243,629 | 1/1981 | Tramezzani | 425/207 |
| 4,309,114 | 1/1982 | Klein et al. | 264/40.6 |

Primary Examiner—Jeffery Thurlow
Attorney, Agent, or Firm—E. W. Somers

[57] ABSTRACT

In order to control the fusion of a polyvinyl chloride plastic material which is being moved along a screw of an extruder from a feed section (36) through a compression section (37) to a metering section (39) and crosshead (26), the melt pressure is measured in the compression section. The melt pressure, which is indicative of the fusion qualities of the plastic material, is used to control the temperature of the plastic material in the feed section to cause it to be substantially homogenous at the crosshead.

6 Claims, 9 Drawing Figures (a)

(b)

(c)

(d)

(e)

(f)

(g)

(h)

(j)

(a)

(b)

(c)

(d)

(e)

(f)

(g)

(h)

(j)

METHODS FOR CONTROLLING VINYL PLASTIC EXTRUDATE

TECHNICAL FIELD

This invention relates to methods of and apparatus for controlling vinyl plastic extrudate and, more particularly, to methods of and apparatus for causing an extrudate comprising a polyvinyl chloride composition to be uniformly homogenous.

BACKGROUND OF THE INVENTION

In a plastic extrusion process, solid plastic material in the form of powder or pellets is fed through a hopper into a cylindrical barrel of an extruder. The barrel which is divided into a plurality of heating zones is heated to a temperature above the melting or flow point of the plastic material. A screw which is rotatably mounted in the barrel is turned to move the plastic material through a feed zone, a compression zone and a metering zone toward a crosshead. The heated walls and frictional heat from the rotating screw cause the plastic material to change from the solid state to the molten state. As a result, a melt pressure is developed. The molten plastic material is then forced through a die in the crosshead which forms it into a desired shape. For example, the plastic material which is flowed through the die may be used to insulate conductors or to jacket cables which are moved through the crosshead.

The extruder compresses the plastic material into a compact solid bed. The term "solid bed" refers to the plastic material prior to a transformation into a substantially less viscous melt material. The advancing flight of the screw forces melted plastic material downwardly along the flight surface and into a circulating melt pool at the rear of a channel between turns of the flight. As the plastic material is moved along the screw channel, the width of the melt pool increases and the width of the solid bed decreases. At some location in the compression section, the solid bed breaks up. As this occurs, the plastic material is transformed into a viscous melt surrounded by less viscous melt. By the time the material has been advanced into the metering section, it should be thoroughly mixed and thermally homogenized.

Output rates for extrudates which cover conductors and which have relatively thin cross sections depend on the ability to control various operating parameters. One such parameter is the melt temperature which is the temperature of the molten material at the outlet of the barrel. Another is the melt pressure which is the pressure of the molten material. The pressure may be controlled by controlling the speed of the extruder screw whereas the melt temperature is controlled by controlling the temperature of each zone. Generally, the lack of temperature uniformity which manifests itself by defects such as nonuniform dimensions or reduced strength characteristics evinces a failure to achieve a thorough mixing of the plastic material within the extruder.

Quality control becomes more difficult when extruding vinyl compositions. Polyvinyl chloride is a relatively inexpensive versatile polymer that can be compounded and extruded as a coating for communication type cable and wire products. It is more flame retardant than polyethylene and, therefore, is highly desirable for indoor cable and wire applications.

Polyvinyl chloride compositions which are used for extrusion generally include not only the basic resin but also other constituents or additives. These include lubricants, stabilizers, pigments, plasticizers, fillers, flame retardants and smoke suppressants.

Additives have a pronounced effect on the processing of the vinyl composition. For example, it has been found that vinyl compositions fuse at various points along the length of the screw. This occurs because of different amounts of shear heat energy that have been imparted to the composition during its compounding. Secondly, this occurs because of the different constituents and/or the different percentage of different constitutents that have been added into the composition. All the constituents contribute to the fusion behavior of the composition. This problem is not experienced when processing polyethylene which is widely used for insulating conductors inasmuch as it is a purer material and is not contaminated by the constituents which are used to impart various properties to a vinyl composition.

Uncontrolled fusion is troublesome because if the material fuses at points too far along the screw toward the crosshead, it is possible to have unmelted material being moved to the die. This may cause the insulation being extruded over a substrate such as a conductor to have a rough outer surface. Such an insulation is difficult to surface color for purposes of identification. This problem is magnified if the screw is being rotated at a relatively low speed.

One solution to this problem has been to compound the polyvinyl chloride material at a lower rate, which of course results in a lower output. Or, the temperature of the composition may be controlled as it is being compounded. However, if the composition is compounded at too low a temperature, then the resin may not be fully fluxed nor fully homogenized. This makes it difficult to reuse the composition in the extruder without substantial working. On the other hand, it is not desirable to have a composition in pellet form that is fused so well that it can't be remelted easily and processed through the extruder. Further, control of the compounding by an end user may not be feasible.

Seemingly, the prior art is not concerned with the fusion of the plastic pellets at different points along the barrel. U.S. Pat. No. 4,197,070 typifies the art. Therein is shown a melt pressure transducer which is positioned near the output end of the barrel adjacent to the tip of the screw and which is used to control the the melt pressure and temperature of the plastic material at the outlet of the barrel. Also, it is common to position temperature sensors along the barrel. However, temperature readings are not indicative of the extent of the melt. Partially melted or completely melted plastic material in the barrel could exhibit the same temperature at the same screw speed.

Still of concern and still not addressed by the prior art is the control of the location along the barrel where the plastic material fuses. This is particularly important in extruding vinyl products because vinyl compositions have different fusion characteristics depending on their heat histories. Without a solution to this problem, pellets received from a compounder may not be fully fluxed by the end user in an extruder. What is needed and what is not available in the prior art is a method of controlling a vinyl plastic composition at the user stage in order to insure a uniformly homogenous extrudate.

SUMMARY OF THE INVENTION

The foregoing needs have been met by the methods and apparatus of this invention which are used to provide a substantially homogenous polyvinyl chloride extrudate. Prefused pellets of a polyvinyl chloride composition are fed into a feed section of an extruder screw and barrel arrangement. A screw disposed in the barrel is rotated to convey the pellets from the feed section through a compression section and a metering section to an extruder crosshead where the plastic material is caused to be extruded into a predetermined cross-sectional shape. The melt pressure, which is defined as the pressure of the melted plastic material in different stages of fusion along the barrel is measured in the compression section. The melt pressure is correlated to the fusion qualities of each particular composition to be extruded. As a result of the melt pressure measurement, the heat energy which is imparted to the plastic material at least prior to the compression section is controlled to achieve predetermined melt pressure characteristics.

Should the melt pressure in the compression section not be a predetermined value for a particular polyvinyl chloride composition, additional heat energy is imparted to the plastic material. This may be accomplished in a number of ways. For example, the temperature in the feed section may be adjusted in order to insure that the material fed along the screw is fully fused. This also may be done by preheating the pellets or by using a force feeding device which compacts the pellets being fed into a feed hopper in order to cause them to fuse more quickly. Of course, the screw speed could be increased to generate more shear heat and improve the fusion of the material, but this may require adjustments of particular manufacturing line parameters to accommodate the increased ouput.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
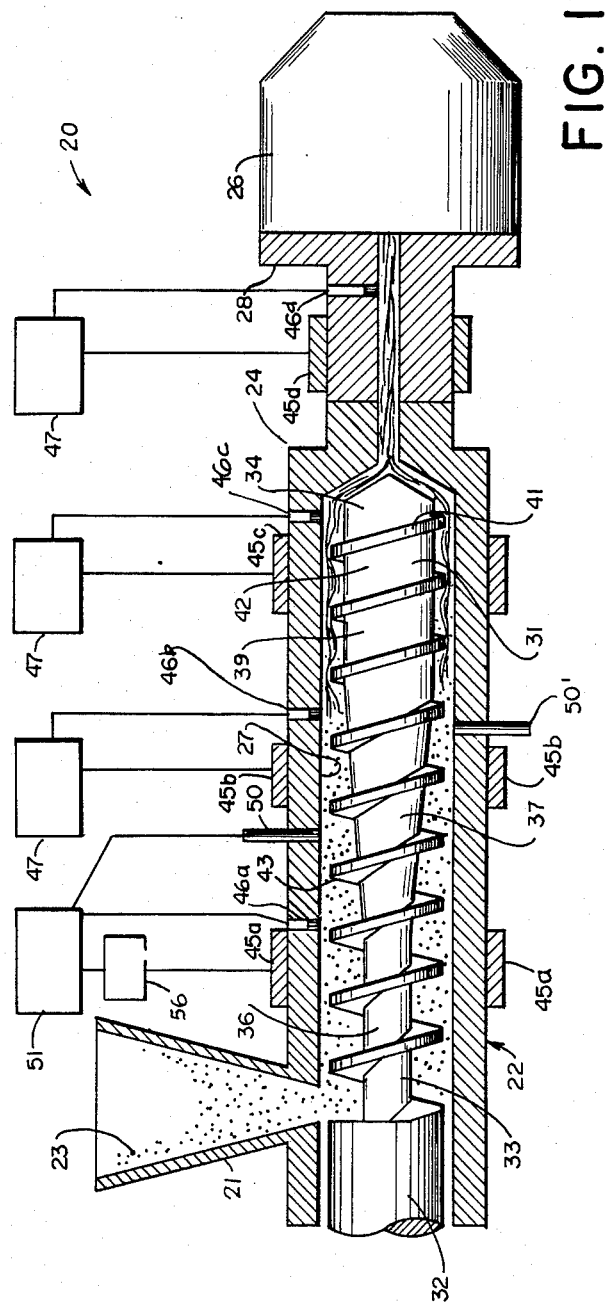
FIG. 1 is an elevational view in section of an extruder screw and barrel arrangement including facilities of this invention for controlling the melt flow of the plastic material.
Figure 2:
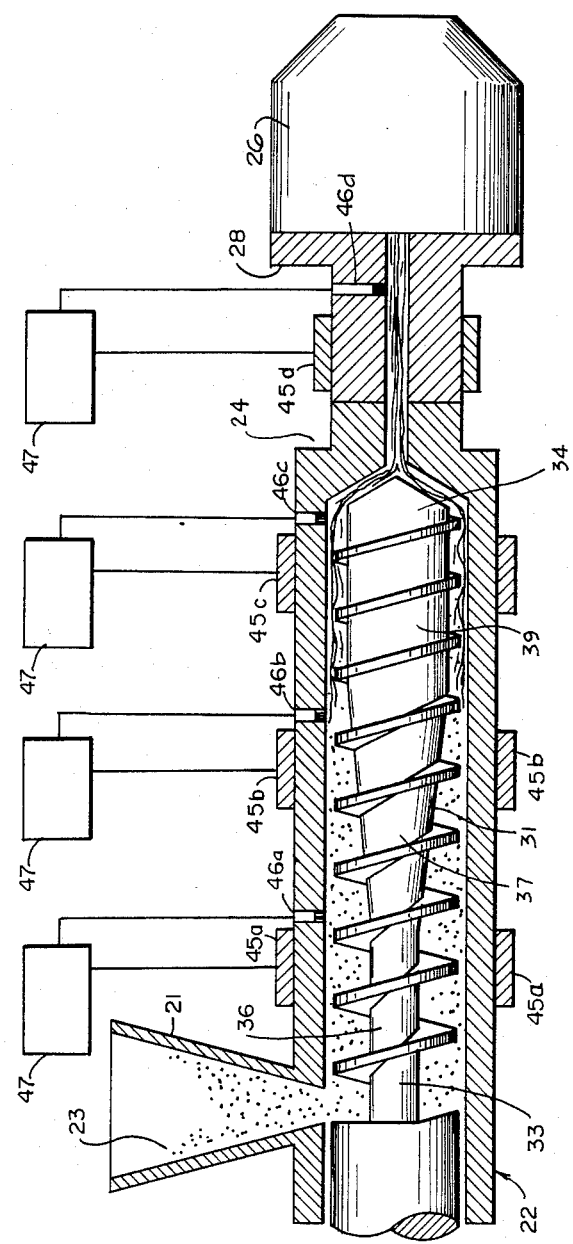
FIG. 2 is an elevational view in section of a conventional prior art extruder.

Referring now to FIG. 1, there is shown an extrusion apparatus, designated by the numeral 20, which includes a hopper 21 into which polyvinyl chloride plastic material in the form of pellets 23—23 is fed. The extrusion apparatus 20 includes many of the features of a typical prior art extruder which is shown in FIG. 2. The hopper 21 communicates with an extrusion barrel designated 22. Plastic materials are advanced from an inlet or plastic-receiving end of the barrel 22 adjacent to the hopper 21 to an outlet or delivery end 24 thereof where the extrudate is formed into a covering on a conductor or cable core (not shown), for example, being advanced continuously through an extruder crosshead 26 adjacent the delivery end.

As can best be seen in FIG. 1, the extrusion barrel 22 has an internal surface of revolution generally in the form of a cylindrical bore 27 of uniform diameter formed therethrough and connecting the receiving end to the delivery end 24. The extrusion barrel 22 also includes a flange 28 at the delivery end 24 thereof which facilitates the attachment of adapters, dies and other auxiliary equipment which are not shown but which are well known in the art.

In order to advance the plastic material from the hopper 21 to the delivery end 24 of the extruder 20, an extruder screw, designated generally by the numeral 31, is disposed concentrically within the bore 27. The extruder screw 31 includes a core 32, having an upstream end 33 thereof adjacent the hopper 21 and a downstream end 34 adjacent the delivery end 24.

The structure of the extruder screw 31 is well known in the art. Beginning at the upstream end 33 thereof, the core 32 of the extruder screw 31 includes, successively, a constant root diameter section 36 referred to as a feed section, a uniformly increasing root diameter section 37, referred to as a compression section, and a uniform diameter root section 39, commonly referred to as the metering section.

The extrusion screw 31 has a thread or flight 41 formed helically thereabout and extending longitudinally along the core 32. A channel 42 is formed by the root diameter surface of the core 32 and facing side walls 43—43 of the flight 41. The external diameter and pitch of the flight 41 are generally constant along the length of the extruder screw 31 from a point just beyond the upstream end 33 of the screw to the delivery end 34 thereof.

The channel 42 formed between the opposing walls of the flight 41 and the surface of the core 32 is generally rectangular in shape and is constant from the upstream end 33 to the beginning of the compression section 37. Then the area of the channel 42 decreases to the the metering section 39 where it remains constant. The general direction of the melting material relative to the screw 31 is lengthwise of the helical channel 42.

As in the prior art extruder shown in FIG. 2, strap heaters 45a–45d (see FIG. 1) are attached to the barrel 22 and are used to increase the temperature of the plastic material being advanced by the screw 31. Temperature sensors 46a–46d are spaced along the barrel 22 and are connected to a heater control panel. Each heater 45 and an associated temperature sensor 46 are adapted to control the temperature of a particular section or zone of the extruder. For example, the heater 45a and its associated temperature sensor 46a are used to control the temperature in the feed section 36. Based on the temperature readings, an operator adjusts the temperature of the zones along the barrel.

Many extruding systems include signal level controllers 47—47 to which signals from the temperature sensors are provided. A controller for use in automatic control applications such as temperature controllers is shown in U.S. Pat. No. 3,824,479 which is incorporated by reference hereinto. As a result of a comparison with preset values, the controllers regulate the operation of the strap heaters 45a-45d. These controllers are available commercially from the Barber-Colman Company of Rockford, Ill., under the designation 580-5A, for example. An automatic temperature control system for an extruder is shown in U.S. Pat. No. 4,197,070 which is incorporated by reference hereinto. See also U.S. Pat. No. 3,924,840.

The apparatus of this invention departs from the prior art in that it includes facilities for determining and controlling the fusion characteristics of a particular vinyl composition at a selected location or locations along the barrel 22. A pressure sensor in the form of a transducer 50 (see FIG. 1) is mounted in the barrel 22. A suitable transducer is one designated model TD10 or TD20 and marketed by the Barber-Colman Company. The pressure sensor 50 is mounted in the compression section of the barrel 22. In a preferred embodiment, a pressure sensor 50' is positioned near the downstream end of the compression section 37. It has been found that a pressure reading is more indicative of the extent of fusion within a polyvinyl chloride composition than is a temperature reading. The output of the pressure sensor 50 may be displayed as readings on a digital indicator, or on a millivoltmeter. Based on these readings, an operator may make an adjustment to at least the heater 45a.

In the preferred embodiment shown in FIG. 1, the regulation of the heaters 45b-45d is accomplished with an arrangement which includes controllers 47—47 of the type mentioned hereinabove. The regulation of the heater 45a in response to its associated temperature sensor 46 in the feed section 36 as well as in response to the pressure sensor 50 in the compression section 37 is accomplished with a setpoint controller 51.

Figure 3:
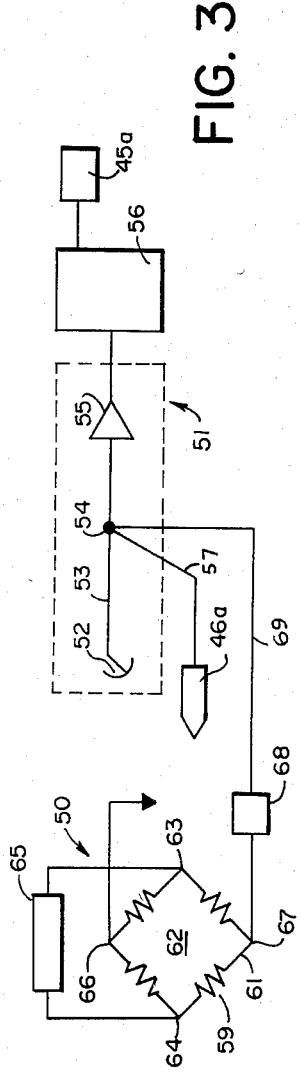
FIG. 3 is a schematic view of a simplified electrical circuit which includes a pressure sensor of this invention.

As can be seen in FIG. 3 the controller 51 includes a setpoint potentiometer 52 connected along a line 53 through a summing junction 54 to an amplifier 55. The output of the controller 51 is supplied to a power controller 56 which drives a load such as the strap heater 45a. A typical power level controller is one designated series CB41 or CB43 as marketed by the Barber-Colman Company. The temperature sensor 46a which is associated with the controller 54 is connected along a line 57 to the summing junction 51.

The pressure sensor 50 includes a probe 59 which comprises one arm 61 of a bridge 62 and which is disposed within the barrel 22. Junction points 63 and 64 of the bridge 62 are connected to a source 65 of current. Junction point 66 is connected to signal common whereas junction point 67 is connected through a logic device 68 such as a Schmitt trigger along a line 69 to the summing junction 54.

In the simplified arrangement shown in FIG. 3, the setpoint controller 51 is adapted to receive an input from the pressure sensor 50 as a result of an unbalanced bridge condition and to make comparisons with setpoint conditions. If necessary, it controls the operation of the strap heater 45a to increase the temperature in the feed section 36.

The above-described facilities are necessary in order to be able to regulate the amount of heat energy which is imparted to the vinyl pellets 23—23 as they are moved along the barrel 22 to control the fusion characteristics of the composition. In the extrusion process, the plastic pellets are heated, sheared, compacted and homogenized into a uniform melt that can be fed to the die. A high degree of thermal uniformity of the extrudate is desired. The extruder must be capable of delivering a homogenous, well fluxed melt to conductor coating tooling within the extruder crosshead 26.

After the polyvinyl chloride composition has been blended by a company which is referred to as a compounder, the composition is subjected to a variety of shear heat conditions depending upon the type of fluxing equipment used. The pellets supplied by a compounder may be made at different melt temperatures notwithstanding their identical compositions. These compositions exhibit different degrees of fusion at different points along the extruder. These characteristics are a function of the work history of the composition when it was fluxed during compounding.

Figure 4:
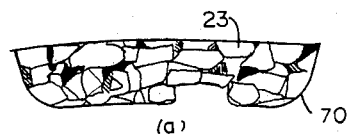
FIGS. 4 and 5 are a series of views of plastic material along the length of the screw to show the various stages through which the plastic material moves in becoming transformed from pellets into a melt flow.
Figure 4:
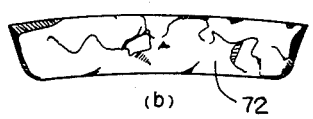
Figure 4:
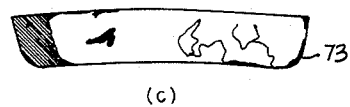
Figure 4:
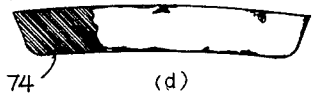
Figure 4:
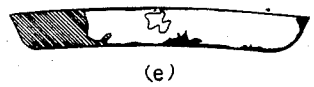
Figure 4:
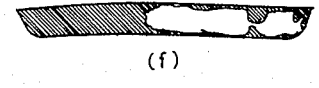
Figure 4:
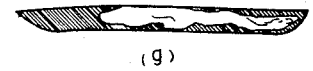
Figure 4:
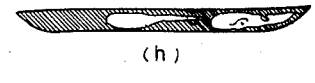
Figure 4:
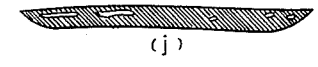
Figure 5:
Figure 5:
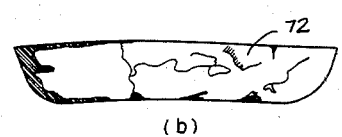
Figure 5:
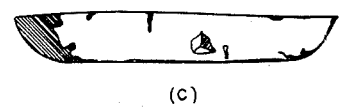
Figure 5:
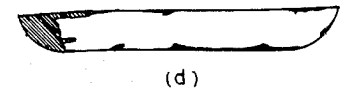
Figure 5:
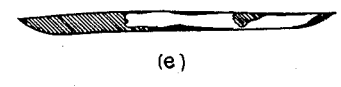
Figure 5:
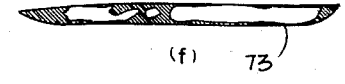
Figure 5:
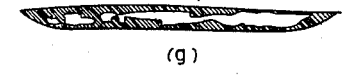
Figure 5:
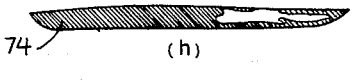
Figure 5:

Fusion of a polyvinyl chloride composition at different locations along an extruder may be demonstrated by adding color concentrate to plastic pellets 23—23 being fed to the extruder. The color concentrate mixes with the polyvinyl chloride material when melting occurs so that the melt regions become colored and are easily distinguishable from the unmelted material. After the extruder has reached a steady-state operation, the rotation of the screw 31 is discontinued, the barrel 22 is cooled until the plastic solidifies, and then the screw is removed from the barrel. The helical coil of plastic about the screw 31 is then removed and sectioned perpendicular to the screw flight 41. The resulting cross-sections 70—70 are shown in FIGS. 4 and 5. Once melting has begun, three distinct regions are noted in a cross section of the channel 42 formed by a helical flight on an extruder screw. These are (1) the unmelted plastic or solid bed 72, (2) a thin melt film 73 between the solid bed and the barrel, and (3) a melt pool 74 where melted material collects. The percentage of unmelted plastic can be evaluated as a function of position in the extruder. The end of the compression section 37 is represented by section (g) in FIGS. 4 and 5.

Final fusion is considered complete with total dispersion of the color. If this does not occur prior to the plastic material reaching the tip of the screw, a less than homogeneous composition will enter the extruder crosshead 26, causing a rough extrudate. A smooth insulation is necessary to allow dot-dash color coding ink marks on the outer surface of the insulation to be discernible.

Figure 6:
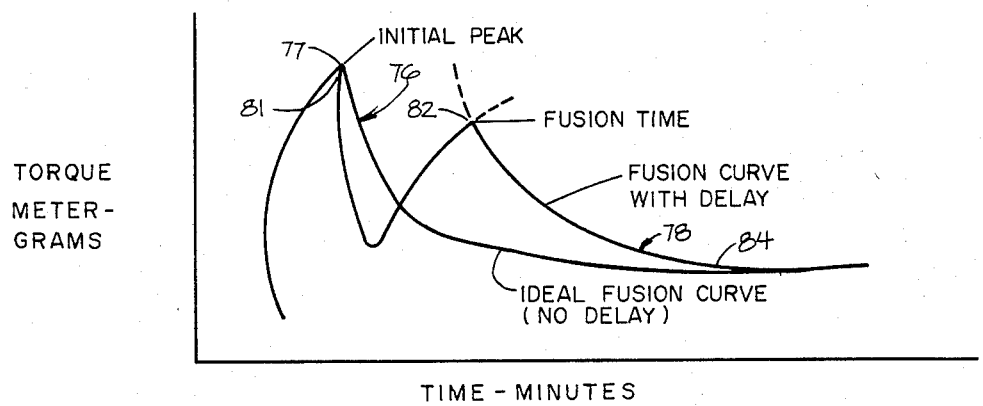
FIG. 6 is a a graph to show fusion point curves for polyvinyl chloride compositions.

Fusion delay is another problem in the processing of vinyl compositions. This characteristic is best explained by viewing FIG. 6 which is a graph of torque versus time of a composition subjected to a test in a torque rheometer. For an ideal vinyl plastic, the graph peaks and then decays with time. This is exemplified by the curve designated 76 having a peak 77. On the other hand, the curve designated 78 shows an initial peak 81, followed by a decay and a second peak 82 before entering a final decay 84. A plastic material having such a characteristic curve experiences what is called a fusion delay in which the plastic material breaks apart but fuses later along the barrel 22. In several samples of the same polyvinyl chloride composition, the fusion point time ranged from zero, which is indicative of an instantaneous peak, to a time in excess of 3 minutes. As a result of fusion delay, the extrudate may not be uniformly homogenous. Plastic materials which are characterized by fusion delay exhibit less color development along the length of the screw than those which approach the ideal curve 76 of FIG. 6.

The methods and apparatus of this invention overcome the problem of nonuniformity of vinyl extrudates. The inability to control the work histories of the compositions at the compounder stage is overcome at the user stage. This is accomplished by measuring the pressure of the melt in the compression section 37. The pressure is correlated to the fusion characteristics of different compositions. Based on these readings, an operator may control manually or through a feedback loop the heat energy which is imparted to the plastic material at least in the feed section 36. For example, the readings may be used to increase the heat energy which is imparted to the barrel by increasing manually the temperature of particular ones of the strap heaters 45a-45d. As a result, the plastic material develops a melt more quickly as it is moved into the compression section 37 where the solid bed breakup occurs. This will insure that a melt pressure will have been developed in the plastic material by the time it is moved out of the compression section and that no unmelted pellets are moved into the metering section 39.

In the operation of the preferred embodiment of the apparatus 20 as shown in FIGS. 1 and 3, a setpoint temperature is dialed into the potentiometer 52. The temperature sensor 46a detects the temperature and applies a signal to the summing junction 54. Should the temperature in the feed section 36 for example not be equal to that of the setpoint, the amplifier 55 is operated to drive the power level controller 56 to turn on the strap heater 45a for the feed section. Once the system is in equilbrium, the controller 51 will generally need to respond only to an input from the pressure sensor 50. The pressure in the compression section 37 is detected by the probe 59 of the sensor 50. As a result, the bridge 62 becomes unbalanced and an output is provided to the logic device 68. Should that signal not exceed a predetermined level, the logic device provides a signal to the summing junction 54. This causes the amplifier 55 to drive the power level controller 56 and turn on the heater 45a. When the melt pressure in the compression section reaches a predetermined value which correlates with desired fusion characteristics for a particular composition, the logic device 68 shuts off and operation of the heater 45a is discontinued.

Figure 7:
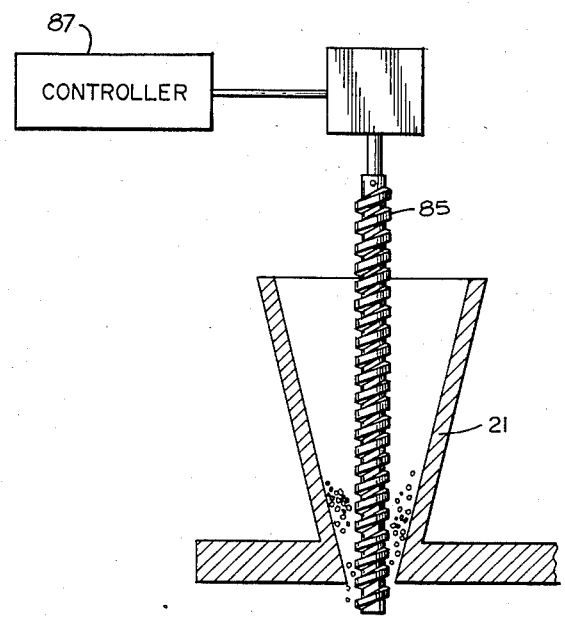
FIG. 7 is an elevational view in section of a hopper which feeds the extruder barrel and which includes provisions of one embodiment of this invention for insuring a uniformily homogenized extrudate.

In an alternative embodiment, a stuffer screw 85 (see FIG. 7) may be disposed in the feed hopper 21 to increase the shear heat in the pellets 23—23 as they are fed into the feed section 36 of the extruder 20. The operation of the stuffer screw 85 is regulated by a controller 87 which is similar to the controller 51 and which is connected to the pressure sensor 50. Signals from the pressure sensor 50 are used to control the rotational speed of the stuffer screw 85 and hence the shear heat imparted to the plastic material.

In another embodiment, an external heater 90 (see FIG. 8) may be mounted adjacent to the feed hopper 21 to direct warm air into engagement with the pellets 23—23 as they are moved through the hopper. This heater may be used alone or in combination with the stuffer screw 85 to control the heat energy which is imparted to the pellets 23—23.

Figure 8:
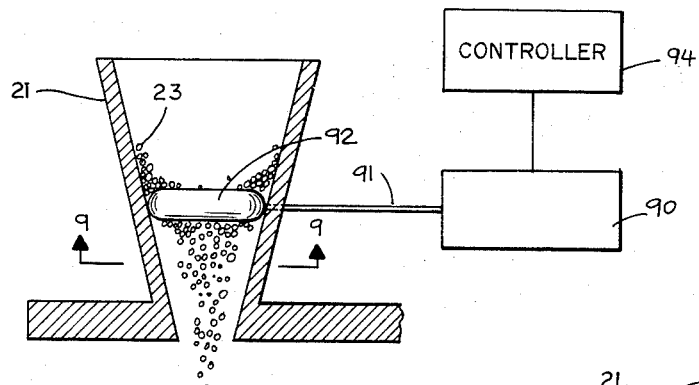
FIG. 8 is another embodiment of this invention for insuring solid bed breakup when extruding polyvinyl chloride compositions.
Figure 9:
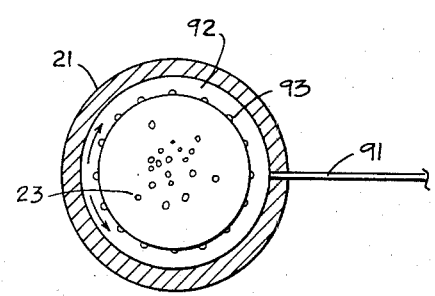
FIG. 9 is an end view of the apparatus of FIG. 8 taken along lines 9—9 thereof.

As can be seen in FIGS. 8 and 9, the external heater 90 is connected through a conduit 91 to an annular member 92 which provides a plenum about the inner wall of the hopper 21. The heated air is directed through openings 93—93 in the wall of the member 92 into engagement with plastic pellets 23—23 being fed through the hopper 21. The operation of the external heater 90 is regulated by a controller 94 which is connected to the pressure sensor 50.

It should be apparent that the extruder 20 may be provided with several facilities for changing the heat energy which is imparted to the plastic material being moved along the barrel. For example, the controller 51 shown in FIG. 1 may be used to regulate the strap heater 45a-45d, the operation of the stuffer screw 85 in the hopper 21 and the operation of the external heater 90 for the hopper 21. The controller 51 also may be used to adjust the rotational velocity of the extruder screw 31.

The use of the methods and the apparatus of this invention insures that the vinyl composition being processed is fused fully when it reaches the extruder die. As a result, the extrudate is substantially homogenous and provides a covering having a smooth outer surface.

It is to be understood that the above-described arrangements are simply illustrative of the invention. Other arrangements may be devised by those skilled in the art which will embody the principles of the invention and fall within the spirit and scope thereof.

What is claimed is:

1. A method of providing a substantially homogenous extrudate of a plastic material which comprises a polyvinyl chloride composition having a fusion characteristic which may vary between supplies thereof, said method comprising the steps of:

feeding pellets of the polyvinyl chloride plastic material into a feed section of an extruder screw and barrel arrangement;

rotating the screw to convey the pellets from the feed section through a compression section and a metering section to an extruder crosshead where the plastic material is caused to be extruded into a predetermined cross-sectional shape; while heating the plastic material;

measuring the melt pressure of the heated plastic material between the feed section and the metering section of the extruder screw; and in response to the measured melt pressure, adjusting the heat energy which is imparted to the plastic material at least prior to the compression section to cause the plastic material that is moved from the barrel to the crosshead to be substantially homogenous.

2. A method of providing a substantially homogenous extrudate of a plastic material comprising a polyvinyl chloride composition which has a fusion characteristic that may vary between supply lots, during the extrusion covering of a substrate, said method comprising the steps of:

feeding pellets of the polyvinyl chloride plastic material into a feed section of an extruder screw and barrel arrangement;

rotating the screw to convey the pellets from the feed section through a compression section and a metering section to an extruder crosshead where the plastic material is caused to enclose a substrate which is being moved through the crosshead, while heating the plastic material;

measuring the melt pressure of the heated plastic material between the feed section and the metering section; and in response to the measured melt pressure, adjusting the heat energy which is imparted to the plastic material at least prior to the compression section to cause the plastic material that is moved from the barrel into the crosshead to be substantially homogenous.

3. The method of claim 2, wherein the heat energy is adjusted by adjusting the temperature in the feed section.

4. The method of claim 2, wherein the heat energy is adjusted by directing preheated air having a predetermined temperature into a hopper which is connected to the feed section.

5. The method of claim 2, wherein the heat energy is adjusted by force-feeding the plastic pellets into a hopper which communicates with the feed section.

6. The method of claim 2, wherein the heat energy is adjusted by adjusting the rotational velocity of the screw in the barrel.

* * * * *